May 13, 1969     F. HERZEGH     3,443,315
TIRE TEST SLITTING DEVICE
Filed Feb. 17, 1967
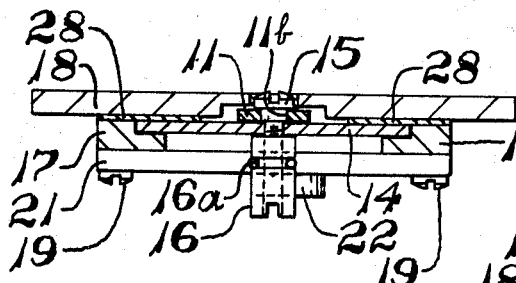
FIG. 3
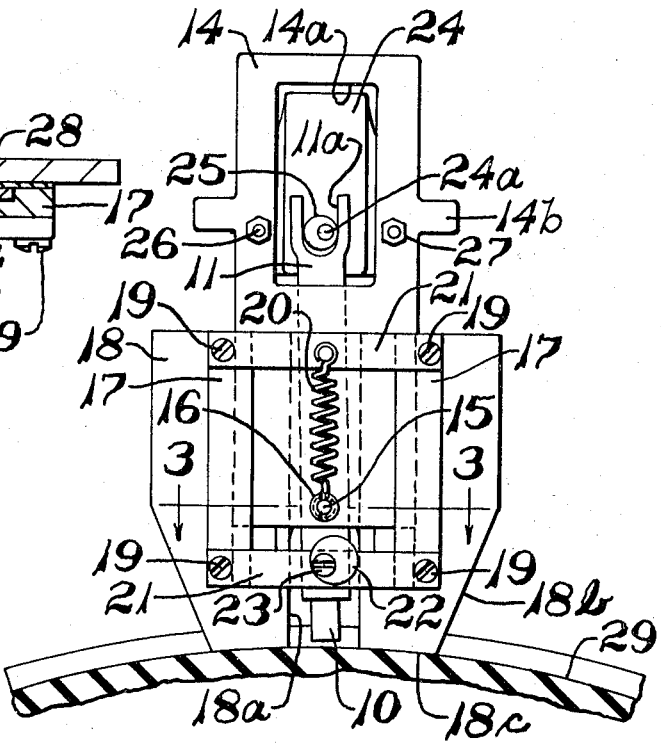
FIG. 2     FIG. 1
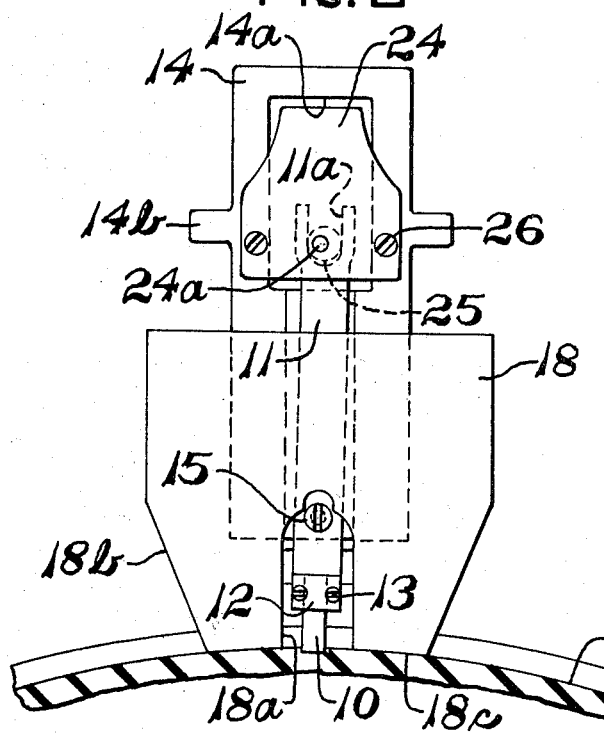
INVENTOR.
FRANK HERZEGH
BY W. A. Shira Jr.
ATTY.

United States Patent Office 3,443,315
Patented May 13, 1969

3,443,315
TIRE TEST SLITTING DEVICE
Frank Herzegh, Shaker Heights, Ohio, assignor to The
B. F. Goodrich Company, New York, N.Y., a corporation of New York
Filed Feb. 17, 1967, Ser. No. 616,980
Int. Cl. B26b 29/02; B26d 1/00, 3/06
U.S. Cl. 30—273                                5 Claims

ABSTRACT OF THE DISCLOSURE

A portable apparatus having a rapidly oscillating cutting blade driven by an electric motor for making precision test cuts in a tire tread. An adjustable stop is provided to pre-determine and fix the depth of penetration of the knife blade.

Background of the invention

The resistance of a pneumatic tire tread to cut and tear growth is frequently determined by making an incision of known length and depth in a tread groove of the tire and observing and measuring the growth of the incision during performance and service tests of the tire. The most significant problem encountered in such a test procedure has been the limitation upon the accuracy with which a test incision could be made to pre-determined dimensions and the corresponding inability to duplicate the dimensions of such incisions. However, if cut and tear growth data are to be meaningfully correlated, it is necessary to standardize or make consistent the dimensions of the initial incision so that the rate of growth of the incisions may be compared for different tires from a common set of reference dimensions.

The means heretofore commonly employed for making a test cut involved repeated hand manipulations of a thin-blade knife of razor sharpness by short cutting strokes in contact with the region to be cut. The depth of the cut is determined by the operator's finger pressure on the knife, and the length of the cut by the length of time in which the knife is drawn over the tire under finger pressure. It can be readily understood from the foregoing that the normal result is an irregular cut of nearly unknown and varying depth.

Summary of the invention

The present invention provides a portable tool for mechanically making, with precision, the above-mentioned test incisions to a pre-determined depth in a tire tread groove. The tool is characterized by having a knife blade operated by a self-contained power source which oscillates the blade rapidly to provide the cutting action. The length of cut is determined by the width of the blade and the length of oscillation which is fixed by the mechanical linkage to the motor. The tool is provided with a blade guard and a surface which facilitates positioning the tool in a tread groove and location of the blade over the area where the cut is to be made. The blade is caused to penetrate the surface of the tire tread to a pre-determined depth by slight finger pressure on a slide which carries the blade and which cooperates with a stop capable of being preset to limit the slide travel and depth of cut. A return spring returns the slide and retracts the blade from engagement with the tire for terminating cutting action of the blade.

The device is small and light enough in weight to be easily manipulated manually and may be readily positioned on a tire and the test incision made without removal of the tire from the test wheel installation or from the test vehicle.

These above-mentioned and other novel features of the invention will become apparent from the following description of the presently preferred embodiment, and certain modifications thereof, described with reference to the drawings accompanying the application and forming a part thereof.

Brief description of the drawings

FIG. 1 is a side view showing the preferred embodiment of the invention inserted in the groove of a tire tread which is shown in partial section;

FIG. 2 is a view similar to FIG. 1 except taken from the side opposite FIG. 1; and FIG. 3 is a transverse section taken along section indicating lines 3—3 of FIG. 1.

Detailed description

As shown in the drawings, the incising element of the tool is a thin flat blade means 10 of generally rectangular shape and has a razor-sharp cutting edge. The blade is securely mounted at one end of a rigid elongated member 11 which is made of aluminum in the presently preferred form of the apparatus. The elongated straight flat strip is greater in width than in thickness, and has a slot 11a in the end opposite the end upon which the blade means is mounted. The member 11 also has a hole 11b passing through its thickness on the longitudinal centerline and preferably between the mid-length point and the blade end, for inserting a pivot mounting means therethrough.

The blade 10 is removably secured to a face of the elongated member 11 by rigid clamp means 12 so arranged that the blade extends longitudinally from the end of the elongated member with the cutting edge parallel to the face of the member 11 and at right angles to the longitudinal sides thereof. The clamp means 12 is shown as a bar extending over the blade means and secured to the member 11 by removable fasteners 13, as for example machine screws threaded into tapped holes in the member.

The member 11 is pivotably mounted for limited oscillatory motion on one side of slide member 14 by a pivot means 15, which here is shown as comprising a shouldered machine screw passing through the slide member and having a cylindrical nut 16, provided with a slot for a screwdriver, threaded thereon. The elongated member 11 is free to arcuately oscillate in a plane parallel to the surface of the slide 14. The slide member 14 is an elongated thin flat metal plate, preferably aluminum, having two longitudinal parallel edges and a rectangular cut-out 14a at one end adapted for mounting a power means therein.

The parallel longitudinal edges of the slide 14 are finished to a smooth straight surface for sliding in channel guides 17 mounted on a base member 18. The base member 18 is also made of thin flat metal stock, preferably aluminum, and has a central elongated U-shaped slot 18a cut out on the lower transverse edge, as seen in the drawings, and adapted to provide clearance for the pivot means and the oscillations of the elongated member 11 and blade means 10. That end portion of the base member, which is provided with slot 18a, is of a thickness such as to permit insertion into a circumferential tire tread groove 29.

The channel guides 17, preferably made of brass, comprise a pair of strips, L shaped in cross-section, mounted in spaced parallel relation one at either opposite longitudinal edge of the slide 14 by fastening means 19 which are preferably machine screws. Each guide 17 thus provides two straight smooth surfaces which form a track for retaining the slide 14 on the base means 18 in a free sliding arrangement between the guides 17. A pair of rigid cross strips 21 are mounted transversely between adjacent ends of the opposite guides.

The slide member 14 and attached blade means 10 are adapted to be retracted from the tire tread cutting position in the tire tread groove by a return spring 20. This spring has one end hooked over a groove 16a formed in the nut 16, while the opposite end of the spring is anchored to that one of the cross strips 21 which is farthest from the pivot means so that the spring is in tension. Sliding travel of slide 14, under the action of the spring 20, is limited in the direction of movement which retracts the blade from the tire, by the nut 16 on pivot means 15 striking the end of the U-shaped clearance slot 18a in the base means. In this position on the movable slide 14 the blade 10 is completely retracted from the tire surface.

An adjustable stop 22 is provided for limiting sliding travel of the slide member 14 in the direction engaging the blade with the tire. The stop is preferably mounted in the center of that one of the strips 21 adjacent the blade 10 by removable fastening means 23, preferably a machine screw. In the presently preferred embodiment, the stop 22 is a disc eccentrically pivoted to be rotatably adjusted in the plane of its face about the fastening means 23. The stop action is afforded by the nut 16 making contact with the edge of the stop disc. It will be readily understood that rotation of the disc 22 changes the distance from the fixed pivot center thereof to the point on the disc edge which makes contact with the nut 16. This provides a ready means for adjusting the depth of penetration of the blade into the tire tread.

The outer end portion of the base 18b provides a blade guard, a surface which facilitates locating the blade over the area to be cut, and a reference surface for determining the depth of cut made by the blade. To facilitate achieving these functions the portion of the base means adjacent both straight edges of the slot 18a is reduced in thickness an amount sufficient to permit ready insertion into the circumferential groove in a tire tread in which it is desired to make an incision. Also, tire-contacting surfaces 18c of the thinned portion are concave to conform with the curvature of the tire periphery. The edges of the surfaces 18c adjacent the slot 18a act as an index surface from which the extension of the blade 10 is measured for presetting the stop 22.

The power means provided for oscillating the elongated member 11, and hence blade 10, is a motor 24 mounted in the cut-out 14a in the slide member 14. The rotating motor shaft 24a extends exteriorly of the motor perpendicular to the surface of the slide member 14 so that the end of the shaft is between the parallel sides of the slot 11a within the slide. The shaft 24a is provided with a circular cam disc 25 positioned within the slot 11a with the outer periphery of the disc adapted to interengage the sides of the slot in a running fit. The cam disc 25 is eccentrically mounted on the motor shaft 24a so that the elongated member 11 is arcuately rocked about its pivot 15 by rotation of the motor shaft. Therefore the knife blade 10, on the opposite end of the elongated member is arcuately oscillated in the plane of its cutting edge. In the present embodiment, the eccentricity of the cam 25 and the dimensions of the parts are chosen such that the stroke of the blade will have a pre-determined value in the range of 0.010–0.020 inch.

The motor 24 is mounted to the slide 14 by removable fasteners 26. Preferably these are a pair of machine screws, positioned one on each side of the motor, passing through holes in the side portions of the slide 14 and secured by retaining nuts 27.

The slide 14 has a pair of finger tabs 14b extending one from each opposite edge of the slide 14 laterally at right angles from the sides and located generally at the mid-length of the cut-out for the motor. The finger tabs 14b serve as convenient means for pushing on the movable slide to extend the blade beyond the edge surfaces 18c on the guard portion of the base 18 and into cutting position.

The embodiment described hereinabove has a pair of thin shims 28 positioned on the base 18, intermediate the guides 17 and the base, and extending along the surface of the base adjacent the guides to serve as friction reducing runners between the portions of the base in sliding contact with the frame 14. The shims which preferably are formed of stainless steel are desirable to prevent surface-friction galling on the portions of the aluminum parts which would otherwise be in sliding contact.

In operation, the depth of cut to be made in the tire is selected and set by adjustment of the stop means 22. The apparatus is then grasped in the hand of the operator and placed in contact with a tire to be cut, with the surfaces 18c of the base inserted in a tread groove and resting firmly on the base thereof. The motor 24 is then energized causing the blade 10 to be rapidly oscillated and while thus operating is placed in cutting engagement with the tire by depressing the slide 14 by pressure of the fingers on the tabs 14b. This finger pressure is continued until the preset depth of cut has been reached which is determined by the nut 16 engaging the stop 22. Finger pressure is then released from the tabs 14b so that the slide and attached blade are retracted from the tire, the motor is stopped and the apparatus is removed from the tire tread groove leaving a cut in the form of a narrow slit of predetermined depth, thickness and length. Other tires, or different locations on the same tire, can be provided with cuts of identical size by repeating the above-described procedure without, however, repositioning the stop 22. When cuts of different depths are desired the fastening means 23 is loosened and stop 22 is partially rotated to the position for permitting the desired projection of the blade 10 beyond the surfaces 18c. This new adjusted position of the stop is retained by retightening the fastening means 23.

Although the presently preferred embodiment of the invention has been specifically described, the invention is not limited to the materials recited. For example, the shims 28 may be eliminated by making the slide of stainless steel or any other suitable material having the property of low surface sliding friction when in contact with aluminum. Alternatively, the guides 17, base 18 and slide 14 may be made of other materials which provide good characteristics of sliding surface friction. Likewise, the invention is not limited to the specific blade fastening means or other details of structure employed in the present embodiment since modifications in these and other portions of the device will be apparent to those skilled in the art. The invention is therefore limited only as required by the spirit and scope of the appended claims.

I claim:

1. A light weight portable apparatus for making a test cut in a pneumatic tire tread comprising: base means having a portion adapted to contact a tire tread in the area in which the cut is to be made, an elongated member provided with blade means having an elongated cutting edge, means pivotally supporting said elongated member upon said base means for limited arcuate oscillating movement of said blade means in contact with the tire tread engaged by the base means in the direction of the length of the blade cutting edge, power means for effecting said oscillating movement, and means to limit the depth of penetration of the said cutting edge into the engaged tire tread.

2. The apparatus as defined in claim 1 and further comprising a slide member, means pivotably mounting said elongated member on said slide member, means supporting and guiding side slide member upon said base member for movement generally radially to and from engagement with a tire tread, and means normally urging said slide member to a blade-retracted position.

3. The apparatus as defined in claim 2 wherein the means to limit the depth of peneration of said cutting edge includes an adjustable stop mounted on said base means and engageable by said slide member when the latter is moved the maximum preselected distance in a direction for engaging the blade means with a tire.

4. A light-weight portable apparatus for making a test cut in a pneumatic tire tread comprising: a generally thin and flat base means including an edge portion having an arcuately concave edge adapted to contact and generally conform to a tire tread in the area in which the cut is to be made, spaced parallel slide guide means on said base portion extending generally radially from the said concave edge, an elongated generally thin and flat slide member retained in sliding engagement on said base means by said guide means, stop means on said base engageable with said slide to limit movement thereof in the direction toward said concave surface, an elongated member, a cutting blade at one end of said elongated member, means pivotally mounting said elongated member to said slide in a position such that the cutting blade projects beyond said concave surface when the slide is moved into engagement with slide stop means, spring means acting on said slide in a direction urging it away from said concave edge, and motor means on said base operatively connected to said elongated member to effect oscillatory motion of the latter about said pivot.

5. The apparatus as defined in claim 4 wherein said stop is a circular disc eccentrically pivoted to rotate in the plane of its face.

References Cited

UNITED STATES PATENTS

| | | | |
|---|---|---|---|
| 1,743,125 | 1/1930 | Fleming | 30—123.3 |
| 2,748,859 | 6/1956 | Myklebust et al. | 157—13 |
| 3,189,997 | 6/1965 | Mount | 30—273 X |
| 3,285,136 | 11/1966 | Wezel | 30—169 X |

MYRON C. KRUSE, *Primary Examiner.*

U.S. Cl. X.R.

30—293

UNITED STATES PATENT OFFICE
CERTIFICATE OF CORRECTION

Patent No. 3,443,315                          May 13, 1969

Frank Herzegh

It is certified that error appears in the above identified patent and that said Letters Patent are hereby corrected as shown below:

Column 4, line 66, "side" should read -- said --.

Signed and sealed this 14th day of April 1970.

(SEAL)
Attest:

Edward M. Fletcher, Jr.                     WILLIAM E. SCHUYLER, JR.
Attesting Officer                            Commissioner of Patents